(12) United States Patent
Wu et al.

(10) Patent No.: US 11,477,170 B2
(45) Date of Patent: Oct. 18, 2022

(54) DECODING METHOD AND APPARATUS

(71) Applicant: HUAWEI TECHNOLOGIES CO., LTD., Guangdong (CN)

(72) Inventors: Kedi Wu, Moscow (RU); Yuejun Wei, Shanghai (CN); Xu Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 362 days.

(21) Appl. No.: 16/691,299

(22) Filed: Nov. 21, 2019

(65) Prior Publication Data
US 2020/0092268 A1 Mar. 19, 2020

Related U.S. Application Data

(63) Continuation of application No. PCT/CN2017/085764, filed on May 24, 2017.

(51) Int. Cl.
| | |
|---|---|
| *H04L 9/40* | (2022.01) |
| *H04L 1/16* | (2006.01) |
| *H04L 9/08* | (2006.01) |
| *H04L 9/14* | (2006.01) |
| *H04L 27/00* | (2006.01) |

(Continued)

(52) U.S. Cl.
CPC ........ *H04L 63/0428* (2013.01); *H04L 1/1671* (2013.01); *H04L 9/0819* (2013.01); *H04L 9/14* (2013.01); *H04L 27/0012* (2013.01); *H04L 69/22* (2013.01); *H04W 80/06* (2013.01)

(58) Field of Classification Search
USPC ........ 713/150, 160, 163, 181; 726/2, 21, 36; 380/255, 264, 276
See application file for complete search history.

(56) References Cited

U.S. PATENT DOCUMENTS

| | | | |
|---|---|---|---|
| 7,801,557 B2* | 9/2010 | Lee | H04M 1/725 455/552.1 |
| 10,762,205 B2* | 9/2020 | Yuan | G06F 3/04886 |

(Continued)

FOREIGN PATENT DOCUMENTS

| | | |
|---|---|---|
| CN | 1441949 A | 9/2003 |
| CN | 1585321 A | 2/2005 |

(Continued)

*Primary Examiner* — Sharif E Ullah
(74) *Attorney, Agent, or Firm* — Womble Bond Dickinson (US) LLP

(57) ABSTRACT

This disclosure provides a decoding method and apparatus in the communications field. The method includes: extracting at least one piece of prior information from at least one first transport block that has been successfully decoded, and assembling the at least one piece of prior information into a prior information set, where one piece of prior information includes header information of a transmission protocol layer of one first transport block; when a to-be-decoded second transport block sent by a transmit end is received, selecting first prior information from the prior information set, where the second transport block is a transport block obtained by the transmit end by coding a third transport block; and decoding the second transport block based on the first prior information and first demodulation information of the second transport block, to obtain the third transport block.

20 Claims, 6 Drawing Sheets

(51) Int. Cl.
*H04L 69/22* (2022.01)
*H04W 80/06* (2009.01)

(56) References Cited

U.S. PATENT DOCUMENTS

| | | | | | |
|---|---|---|---|---|---|
| 2003/0103584 | A1* | 6/2003 | Bjerke | ............... | H04L 1/005 375/340 |
| 2009/0177951 | A1* | 7/2009 | Lee | ............... | H03M 13/3994 714/E11.002 |
| 2013/0139094 | A1* | 5/2013 | Lu | ............... | G06F 3/0233 715/773 |
| 2014/0169797 | A1* | 6/2014 | Callard | ............... | H03M 13/6312 398/208 |
| 2014/0324912 | A1* | 10/2014 | Lei | ............... | G06F 21/6218 707/783 |
| 2015/0070340 | A1* | 3/2015 | Trachtenberg | ............... | H04N 5/64 345/211 |
| 2015/0334209 | A1* | 11/2015 | Song | ............... | H04L 69/163 370/312 |
| 2016/0248738 | A1* | 8/2016 | Brandsma | ............... | H04L 63/0435 |
| 2017/0126360 | A1* | 5/2017 | Millar | ............... | H04L 1/0057 |
| 2017/0149562 | A1* | 5/2017 | Takada | ............... | G06F 21/72 |
| 2020/0092268 | A1* | 3/2020 | Wu | ............... | H04L 69/22 |
| 2020/0119750 | A1* | 4/2020 | Heo | ............... | H03M 13/6502 |
| 2021/0384036 | A1* | 12/2021 | Fisher | ............... | C23C 16/14 |

FOREIGN PATENT DOCUMENTS

| | | | | |
|---|---|---|---|---|
| CN | 101841339 A | 9/2010 | | |
| CN | 101911509 A | 12/2010 | | |
| CN | 102684709 A | 9/2012 | | |
| CN | 104937858 A | 9/2015 | | |
| CN | 106936532 A | 7/2017 | | |
| CN | 107579961 A | 1/2018 | | |
| WO | 2007021224 A1 | 2/2007 | | |
| WO | WO-2007021224 A1 * | 2/2007 | ........ | H03M 13/3769 |
| WO | 2015027785 A1 | 3/2015 | | |
| WO | 2017032255 A1 | 3/2017 | | |

\* cited by examiner

DECODING METHOD AND APPARATUS

CROSS-REFERENCE TO RELATED APPLICATIONS

This application is a continuation of International Application No. PCT/CN2017/085764, filed on May 24, 2017, the disclosure of which is herein incorporated by reference in its entirety.

TECHNICAL FIELD

This disclosure relates to the communications field, and in particular, to a decoding method and apparatus.

BACKGROUND

In a current communications system, most transmission services are transmission control protocol (TCP)-based transmission services. In a process of performing a TCP-based transmission service, when a TCP server sends service data to a terminal, the terminal receives the service data sent by the TCP server, and sends feedback information to the TCP server. The feedback information may be an acknowledgement (ACK). The TCP server performs operations such as retransmission and subsequent transmission based on the feedback information. For example, when the current communications system is a wireless mobile cellular communications system, the terminal forwards the feedback information to the TCP server by using a base station. A specific process is as follows: The terminal codes the feedback information to obtain a transport block including the feedback information, and sends the transport block to the base station. The base station decodes the transport block, and sends a decoding result obtained after the decoding to the TCP server. The TCP server receives the decoding result, and obtains the feedback information sent by the terminal.

In the prior art, when being to send the feedback information, the terminal needs to add the feedback information to header information of a transport layer, separately process the header information of the transport layer at a packet data convergence protocol (PDCP) layer, a radio link control (RLC) layer, and a media access control (MAC) layer, and code processed information to generate the transport block including the feedback information. The process is specifically as follows: At the transport layer, the terminal adds the feedback information to the header information of the transport layer, and sends the header information of the transport layer to the PDCP layer. At the PDCP layer, the terminal adds header information of the PDCP layer to the header information of the transport layer, generates protocol data unit (PDU) information, and sends the PDU information to the RLC layer. At the RLC layer, the terminal segments and cascades the PDU information, adds header information of the RLC layer to the PDU information, and sends the PDU information to which the header information of the RLC layer is added to the MAC layer. At the MAC layer, the terminal continues to add header information of the MAC layer to the PDU information to which the header information of the RLC layer is added, and codes the PDU information to which the header information of the RLC layer and the header information of the MAC layer are added, to obtain the transport block. The terminal sends the transport block to the base station. The base station receives the transport block sent by the terminal, and decodes the transport block. A decoding process is specifically as follows: The base station obtains a demodulation soft value of the transport block, inputs the demodulation soft value and the transport block to a channel decoder of a physical layer, and decodes the transport block by using the channel decoder.

In a process of implementing this disclosure, the inventors find that the prior art has at least the following disadvantages:

When the feedback information is coded to obtain the transport block, the header information of the transport layer, the header information of the PDCP layer, the header information of the RLC layer, the header information of the MAC layer, and the like are combined. However, the transport block is decoded based on only the demodulation soft value. Consequently, an error rate is relatively high, and accuracy of the decoding method is relatively low.

SUMMARY

To resolve a prior-art problem, embodiments of this disclosure provide a decoding method and apparatus. The technical solutions are as follows:

According to a first aspect, a decoding method is provided, where the method includes:

extracting at least one piece of prior information from at least one first transport block that has been successfully decoded, and assembling the at least one piece of prior information into a prior information set, where one piece of prior information includes header information of a transmission protocol layer of one first transport block;

when a to-be-decoded second transport block sent by a transmit end is received, selecting first prior information from the prior information set, where the second transport block is a transport block obtained by the transmit end by coding a third transport block; and decoding the second transport block based on the first prior information and first demodulation information of the second transport block, to obtain the third transport block.

In this embodiment of this disclosure, a receive end extracts the prior information from the at least one first transport block that has been successfully decoded, and assembles the prior information into the prior information set. The prior information includes the header information of the transmission protocol layer of the at least one first transport block that has been successfully decoded. When receiving the to-be-decoded second transport block sent by the transmit end, the receive end selects the first prior information from the prior information set. The second transport block is the transport block obtained by the transmit end by coding the third transport block. Then, the receive end decodes the second transport block based on the first prior information and the first demodulation information of the second transport block, to obtain the third transport block. The receive end decodes the second transport block based on both the first demodulation information and the first prior information, and the first prior information includes the header information of the transmission protocol layer of the at least one first transport block that has been successfully decoded. Therefore, a bit error rate of decoding the second transport block by the receive end is reduced, and decoding accuracy is improved.

In a possible implementation of the first aspect, before the selecting first prior information from the prior information set, the method further includes:

decoding the second transport block based on the first demodulation information, to obtain a fourth transport block; and if the fourth transport block is different from the third transport block, performing the operation of selecting first prior information from the prior information set.

In this embodiment of this disclosure, the receive end first decodes the second transport block based on the first demodulation information of the second transport block, and if the decoding fails, in other words, the fourth transport block is different from the third transport block, the receive end selects the first prior information, so that the receive end can subsequently decode the second transport block based on both the first prior information and the first demodulation information, thereby improving decoding efficiency.

In a second possible implementation of the first aspect, the method further includes:

obtaining first verification information and second verification information, where the first verification information is verification information of the third transport block, and the second verification information is verification information of the fourth transport block; and if the first verification information is different from the second verification information, determining that the fourth transport block is different from the third transport block.

In this embodiment of this disclosure, the receive end obtains the first verification information of the third transport block and the second verification information of the fourth transport block, and determines, based on the first verification information and the second verification information, whether the second transport block is successfully decoded, so as to improve accuracy of determining whether the decoding succeeds.

In a third possible implementation of the first aspect, the extracting at least one piece of prior information from at least one first transport block that has been successfully decoded, and assembling the at least one piece of prior information into a prior information set includes:

obtaining the at least one first transport block;

extracting header information of a transmission protocol layer of each of the at least one transport block;

generating the at least one piece of prior information based on the header information of the transmission protocol layer of each of the at least one transport block; and assembling the at least one piece of prior information into the prior information set.

In this embodiment of this disclosure, the receive end may extract the header information of the transmission protocol layer of each first transport block, generate the at least one piece of prior information based on the header information of the transmission protocol layer of each first transport block, and assemble the at least on piece of prior information into the prior information set, so that the receive end can directly select the first prior information from the prior information set, thereby improving efficiency of obtaining the first prior information by the receive end.

In a fourth possible implementation of the first aspect, after the decoding the second transport block based on the first prior information and first demodulation information of the second transport block, to obtain the third transport block, the method further includes:

extracting prior information from the third transport block; and updating the prior information set based on the extracted prior information.

In this embodiment of this disclosure, each time decoding succeeds, the receive end extracts the prior information from the successfully decoded third transport block, and updates the prior information set in real time based on the extracted prior information, so as to ensure time validity and accuracy of the prior information set, and improve accuracy of obtaining the first prior information by the receive end.

In a fifth possible implementation of the first aspect, the decoding the second transport block based on the first prior information and first demodulation information of the second transport block, to obtain the third transport block includes:

performing saturation processing on the first demodulation information based on the first prior information, to obtain second demodulation information; and decoding the second transport block based on the second demodulation information, to obtain the third transport block.

In this embodiment of this disclosure, because the second demodulation information is demodulation information obtained by performing saturation processing on the first demodulation information by using the first prior information, the receive end decodes the second transport block based on the second demodulation information obtained after the saturation processing, so as to improve decoding accuracy.

In a sixth implementation of the first aspect, the decoding the second transport block based on the second demodulation information, to obtain the third transport block includes:

decoding the second transport block based on the second demodulation information, to obtain a fifth transport block;

if the fifth transport block is different from the third transport block, selecting second prior information from the prior information set, where the second prior information is any prior information in the prior information set other than the first prior information; and decoding the second transport block based on the second prior information and the first demodulation information, to obtain the third transport block.

In this embodiment of this disclosure, if the receive end fails to decode the second transport block based on the second demodulation information, in other words, the fifth transport block is different from the third transport block, the receive end may further continue to select the second prior information from the prior information set, and decode the second transport block again based on both the second prior information and the first demodulation information until the decoding succeeds, in other words, until the receive end obtains the third transport block. The receive end decodes the second transport block again, so as to improve robustness of the decoding method, and improve accuracy of decoding the second transport block by the receive end.

In a seventh possible implementation of the first aspect, the second transport block is a data block obtained by the transmit end by encrypting the third transport block; and the selecting first prior information from the prior information set includes:

selecting third prior information from the prior information collection, where the third prior information is prior information extracted by the receive end from an encrypted first transport block;

determining a first encryption key based on a sixth transport block, where the sixth transport block is a successfully decoded transport block prior to the second transport block; and encrypting the third prior information by using the first encryption key, to obtain the first prior information.

In this embodiment of this disclosure, when the second transport block is the data block obtained by the transmit end by encrypting the third transport block, the receive end may determine the first encryption key based on the successfully decoded transport block prior to the second transport block, namely, the sixth transport block, and encrypt the third prior information in the prior information set by using the first encryption key, to obtain the first prior information, so that the receive end can subsequently decode the encrypted second transport block based on both the first prior information and the first demodulation information, thereby improving applicability of the decoding method.

In an eighth implementation of the first aspect, the determining a first encryption key based on a sixth transport block includes:

extracting a second encryption key from the sixth transport block; and determining the first encryption key based on the second encryption key and a preset key algorithm.

In this embodiment of this disclosure, when the second transport block is the data block obtained by the transmit end by encrypting the third transport block, the receive end directly extracts the second encryption key from the successfully decoded sixth transport block prior to the second transport block, so that the receive end can determine the first encryption key based on the preset key algorithm and the second encryption key, thereby improving efficiency of obtaining the first encryption key by the receive end.

According to a second aspect, an embodiment of this disclosure provides a decoding apparatus, where the decoding apparatus includes at least one unit, and the at least one unit is configured to implement the decoding method according to the first aspect or any one of the possible implementations of the first aspect.

According to a third aspect, an embodiment of this disclosure provides a system chip, applied to a receive end, where the chip includes an input/output interface, at least one processor, a memory, and a bus; the input/output interface is connected to the at least one processor and the memory by using the bus, and the input/output interface is configured to implement communication between the receive end and a transmit end; and the at least one processor executes an instruction stored in the memory, so that the receive end is enabled to perform the decoding method according to the first aspect or any one of the possible implementations of the first aspect.

According to a fourth aspect, an embodiment of this disclosure provides a computer storage medium, configured to store a computer software instruction used by a receive end, where the computer software instruction includes a program designed for the receive end to perform the foregoing first aspect.

Beneficial effects brought by the technical solutions provided in the embodiments of this disclosure are as follows:

In the embodiments of this disclosure, the receive end extracts the prior information from the at least one first transport block that has been successfully decoded, and assembles the prior information into the prior information set. The prior information includes the header information of the transmission protocol layer of the at least one first transport block that has been successfully decoded. When receiving the to-be-decoded second transport block sent by the transmit end, the receive end selects the first prior information from the prior information set. The second transport block is the transport block obtained by the transmit end by coding the third transport block. Then, the receive end decodes the second transport block based on the first prior information and the first demodulation information of the second transport block, to obtain the third transport block. The receive end decodes the second transport block based on both the first demodulation information and the first prior information, and the first prior information includes the header information of the transmission protocol layer of the at least one first transport block that has been successfully decoded. Therefore, a bit error rate of decoding the second transport block by the receive end is reduced, and decoding accuracy is improved.

DESCRIPTION OF EMBODIMENTS

To make the objectives, technical solutions, and advantages of this disclosure clearer, the following further describes the implementations of this disclosure in detail with reference to the accompanying drawings.

All the foregoing optional technical solutions may be randomly combined to form optional embodiments of this disclosure. Details are not described herein.

Figure 1:
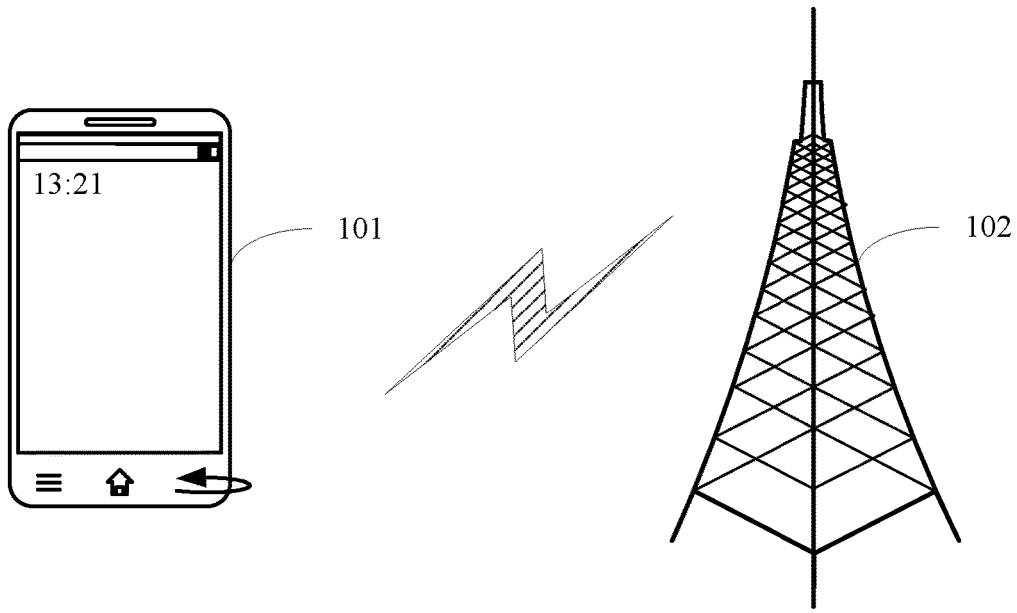
FIG. 1 is a schematic diagram of a decoding implementation environment according to an embodiment of this disclosure.

FIG. 1 is a schematic diagram of a decoding implementation environment according to an embodiment of this disclosure. The implementation environment includes a transmit end 101 and a receive end 102.

The transmit end 101 and the receive end 102 may communicate with each other by using a transmission protocol of a wireless communications system. The wireless communications system may be any one of the following wireless communications systems, including but not limited to: a long term evolution (LTE) system, a universal mobile telecommunications system (UMTS), and the like. The wireless communications system may use any one of the following transmission protocols, including but not limited to: the transmission control protocol, the user datagram protocol (UDP), and the like. When the transmit end 101 and the receive end 102 communicate with each other by using the transmission protocol of the wireless communications system, a transmission protocol layer corresponding to the transmission protocol may include a physical layer, a data link layer, and a transport layer.

When the transmit end 101 needs to send a third transport block to the receive end 102, the transmit end 101 codes the third transport block to obtain a second transport block, and sends the second transport block to the receive end 102. The receive end 102 receives the second transport block sent by the transmit end 101, and decodes the second transport block to obtain the third transport block.

A process in which the transmit end 101 codes the third transport block to obtain the second transport block may be as follows:

At a transport layer of the transmit end 101, the transmit end 101 adds header information of the transport layer to the third transport block, and sends the third transport block to which the header information of the transport layer is added to a data link layer of the transmit end 101. At the data link layer, the transmit end 101 adds header information of the data link layer to the third transport block to which the header information of the transport layer is added, and sends the third transport block to which the header information of the transport layer and the header information of the data link layer are added to a physical layer of the transmit end 101. The transmit end 101 codes, by using a channel coder of the physical layer, the third transport block to which the header information of the transport layer and the header information of the data link layer are added, to obtain the second transport block. The transmit end 101 sends the second transport block to the receive end 102.

The receive end 102 receives the second transport block sent by the transmit end 101, and decodes the second transport block by using a channel decoder of a physical layer of the receive end 102, to obtain the third transport block. A process in which the channel decoder decodes the second transport block to obtain the third transport block may be as follows:

The channel decoder decodes the second transport block based on first demodulation information of the second transport block, to obtain a fourth transport block. If the fourth transport block is the same as the third transport block, the channel decoder determines that the second transport block is successfully decoded. If the fourth transport block is different from the third transport block, the channel decoder determines that the second transport block fails to be decoded.

In this embodiment of this disclosure, because there is a correlation between pieces of header information of transmission protocol layers of transport blocks sent by the transmit end 101 to the receive end 102, the receive end 102 may set a prior information estimation module of a data link layer of the receive end 102. Each time the receive end 102 successfully decodes a received transport block, the receive end 102 extracts header information of a transmission protocol layer of the successfully decoded transport block by using the prior information estimation module of the data link layer, to obtain prior information.

In a possible design of this embodiment of this disclosure, when the receive end 102 fails to decode the second transport block, the receive end 102 may decode the second transport block based on both the prior information of the transport block that has been successfully decoded and the first demodulation information. The first demodulation information may include demodulation information of a system bit and demodulation information of a check bit of the second transport block. The demodulation information may be a demodulation soft value. The prior information is the header information of the transmission protocol layer of the transport block that has been successfully decoded. The second transport block is decoded based on both the prior information and the first demodulation information, so as to improve decoding accuracy.

The transmit end 101 may be a terminal or a base station, and the receive end 102 may also be a terminal or a base station. The terminal may be a mobile phone terminal or a computer terminal. When the wireless communications system is the LTE system, the base station may be an evolved NodeB (eNodeB). When the wireless communications system is the UMTS, the base station may be a NodeB. The third transport block may be service data, or may be feedback information. The feedback information may be an ACK or a negative acknowledgement (NACK).

Figure 2:
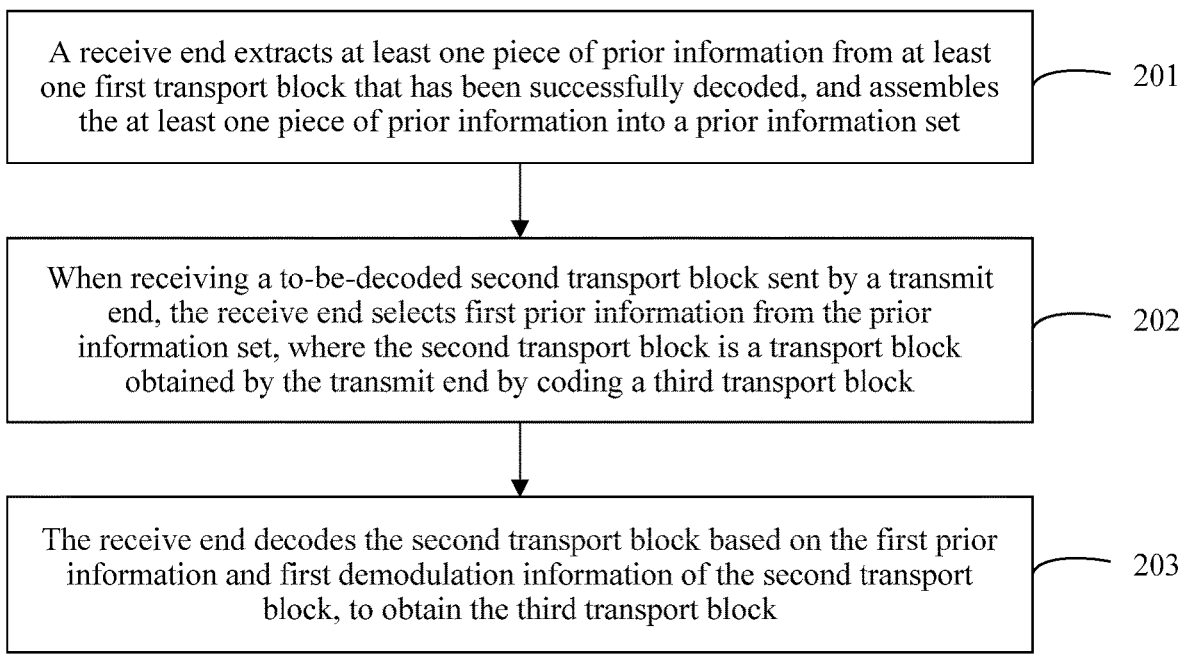
FIG. 2 is a flowchart of a decoding method according to an embodiment of this disclosure.

Referring to FIG. 2, an embodiment of this disclosure provides a decoding method. The method may be performed by a receive end. As shown in FIG. 2, the method includes the following operations.

Operation 201: The receive end extracts at least one piece of prior information from at least one first transport block that has been successfully decoded, and assembles the at least one piece of prior information into a prior information set.

Before decoding a received transport block, the receive end obtains the prior information set through training based on the at least one first transport block that has been successfully decoded. Correspondingly, this operation may be implemented in the following operations 2011 and 2012.

Operation 2011: The receive end obtains the at least one first transport block, and extracts header information of a transmission protocol layer of each of the at least one first transport block.

The receive end stores the first transport block that has been successfully decoded in a transport block set. The transport block set includes the at least one first transport block. When obtaining the prior information set through training, the receive end obtains the at least one first transport block from the transport block set.

In a possible implementation, the receive end further stores a decoding time of each transport block in the transport block set. When a decoding time of a transport block is closer to a current time, header information of a transmission protocol layer of the transport block is more closely correlated to header information of a transmission protocol layer of a currently decoded transport block. Therefore, the operation in which the receive end obtains the at least one first transport block may be as follows:

The receive end selects, from the transport block set based on the decoding time of each first transport block in the transport block set, a preset quantity of first transport blocks whose decoding times are closest to the current time. The preset quantity may be set and modified as required, and the preset quantity is not specifically limited in this embodiment of this disclosure. For example, the preset quantity may be 10 or 20.

In this embodiment of this disclosure, the header information of the transmission protocol layer includes at least header information of a data link layer, and the header information of the transmission protocol layer may further include header information of a transport layer. If the header information of the transmission protocol layer includes the header information of the data link layer, the operation in which the receive end extracts the header information of the transmission protocol layer of each first transport block may be implemented in the following first manner. If the header information of the transmission protocol layer includes the header information of the data link layer and the header information of the transport layer, the operation in which the receive end extracts the header information of the transmission protocol layer of each first transport block may be implemented in the following second manner.

In the first implementation, the operation in which the receive end extracts the header information of the transmission protocol layer of the first transport block may be as follows: The receive end extracts the header information of the data link layer of the first transport block.

The data link layer includes a MAC layer, an RLC layer, and a PDCP layer. Correspondingly, the header information of the data link layer includes at least one of header information of the MAC layer, header information of the RLC layer, and header information of the PDCP layer.

The header information of the MAC layer includes a logical channel identifier (LCD) and the like.

The header information of the RLC layer includes a serial number (SN) of the RLC layer and the like.

The header information of the PDCP layer includes an SN number of the PDCP layer and the like.

In the second implementation, the operation in which the receive end extracts the header information of the transmission layer of the first transport block may be as follows:

The receive end extracts the header information of the data link layer and the header information of the transport layer of the first transport block, and combines the header information of the data link layer and the header information of the transport layer, to obtain the header information of the transmission protocol layer.

The transport layer includes an internet protocol (IP) layer and a TCP layer. Correspondingly, the header information of the transport layer includes but is not limited to any one of header information of the IP layer, header information of the TCP layer, and the like.

The header information of the IP layer includes at least one of the following information: a version number plus an IP header length (one byte), a service type (one byte), a total length of the header information of the IP layer (two bytes), a mark field plus a segment offset (two bytes), a time to live (TTL) (one byte), a transmission protocol (one byte), a source address of the first transport block (four bytes), and a destination address of the first transport block (four bytes).

The header information of the TCP layer includes at least one of the following information: a source port number plus a target port number of a transmit end (four bytes), a serial number of the TCP layer (four bytes), a data offset plus a reserved field plus a control field (two bytes), and an urgent pointer (two bytes).

It should be noted that the receive end has a robust header compression (RoHC) function. When the RoHC function is enabled, the header information of the transmission protocol layer includes the header information of the data link layer, and the receive end extracts the header information of the transmission protocol layer of the first transport block in the foregoing first manner. When the RoHC function is disabled, the header information of the transmission protocol layer includes the header information of the data link layer and the header information of the transport layer, and the receive end extracts the header information of the transmission protocol layer of the first transport block in the foregoing second manner.

Operation 2012: The receive end generates the at least one piece of prior information based on the header information of the transmission protocol layer of each of the at least one transport block, and assembles the at least one piece of prior information into the prior information set.

The operation in which the receive end generates the prior information based on the header information of the transmission protocol layer of each first transport block may be as follows:

The receive end uses the header information of the transmission protocol layer of the first transport block as the prior information; or the receive end determines header information of a transmission protocol layer of a next transport block based on the header information of the transmission protocol layer of the first transport block, and uses the determined header information of the transmission protocol layer of the next transport block as the prior information.

It should be noted that there is a correlation between pieces of header information of transmission protocol layers of a plurality of transport blocks sent by the transmit end at the same time. During actual transmission, the header information of the transmission protocol layer includes first header information and second header information. The first header information is same header information for all transport blocks, and the second header information is information generated based on header information of other transport blocks. For example, the first header information may be a source port number plus a target port number of the TCP layer (four bytes), a source address of the IP layer (four bytes), or a destination address of the IP layer (four bytes), and the second header information may be an SN number of the PDCP layer or an SN number of the RLC layer. Correspondingly, the operation in which the receive end determines the header information of the transmission protocol layer of the next transport block based on the header information of the transmission protocol layer of the first transport block may be as follows:

The receive end determines third header information based on the second header information of the transmission protocol layer of the first transport block according to a preset rule, and combines the first header information and the third header information of the transmission protocol layer of the first transport block, to obtain the header information of the transmission protocol layer of the next transport block.

The preset rule may be set and modified as required, and the preset rule is not specifically limited in this embodiment of this disclosure. For example, the preset rule may be increasing the SN number of the PDCP layer or the SN number of the RLC layer by 1.

For example, the serial number of the PDCP layer in the header information of the transmission protocol layer of the first transport block is used as an example for description. The serial number of the PDCP layer may be binary data with a length of eight bits: 0000 0001. Binary data of each bit in the first bit to the seventh bit that are included in the serial number is 0, and prior information generated by the receive end based on the binary data of each bit in the first bit to the seventh bit may be 10. Binary data 1 of the first bit in the prior information represents that information in which the serial number is 0 is extracted, and binary data 0 of the second bit in the prior information is a value of the serial number at the bit. Binary data of the eighth bit in the serial number is 1, and prior information generated by the receive end based on the binary data of the eighth bit may be 11. Binary data 1 of the first bit in the prior information represents that information in which the serial number is 1 is extracted, and binary data 1 of the second bit in the prior information is information of the serial number at the eighth bit.

Figure 3:
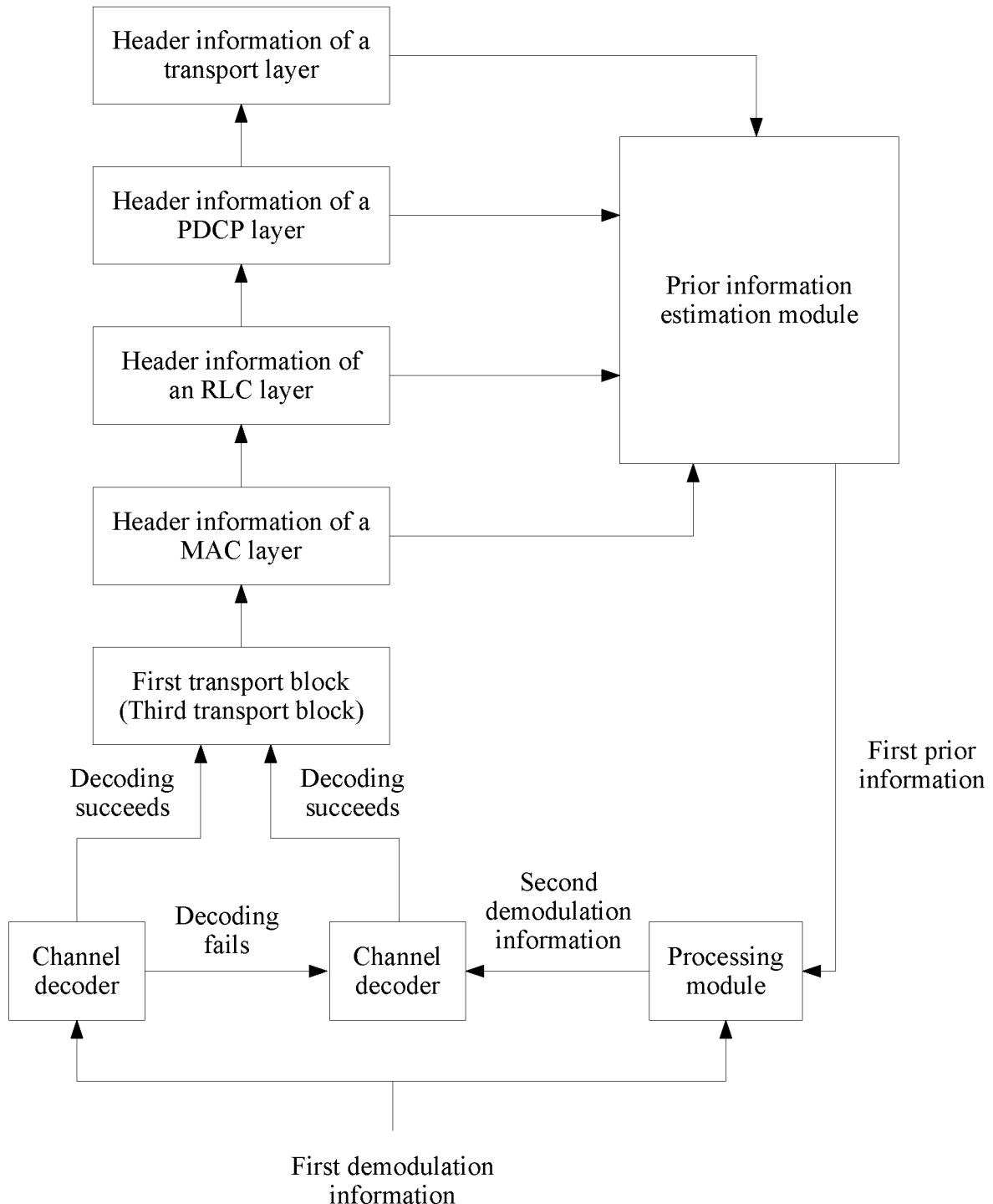
FIG. 3 is a schematic diagram of a decoding process according to an embodiment of this disclosure.

In a possible design of this embodiment of this disclosure, the receive end may set a prior information estimation module of the data link layer. The prior information estimation module is configured to: extract the prior information from the at least one first transport block that has been successfully decoded, and assemble the prior information into the prior information set. As shown in FIG. 3, the receive end extracts, by using the prior information estimation module, the header information of the data link layer and the header information of the transport layer of the at least one first transport block that has been successfully decoded, to generate the at least one piece of prior information, and assembles the at least one piece of prior information into the prior information set.

When the receive end needs to perform decoding by using a channel decoder of a physical layer, the receive end sends first prior information in the prior information set to the channel decoder of the physical layer by using the prior information estimation module of the data link layer. The operation in which the receive end extracts the prior information by using the prior information estimation module, and assembles the prior information into the prior information set may be as follows: When the receive end successfully decodes the at least one first transport block by using the channel decoder of the physical layer, the receive end sends the at least one first transport block that has been successfully decoded to the data link layer. Then, the receive end extracts, by using the prior information estimation module of the data link layer, the header information of the transmission protocol layer of the at least one first transport block that has been successfully decoded, to generate the at least one piece of prior information, and assembles the at least one piece of prior information into the prior information set.

The first transport block may be set and modified based on a user need, and the first transport block is not specifically limited in this embodiment of this disclosure. For example, the first transport block may be a transport block used by the transmit end to provide a positive acknowledgement for received service data, or a transport block used by the transmit end to provide a negative acknowledgement for received service data. The first transport block may alternatively be a transport block of service data received by the receive end.

For example, an example in which the first transport block is the transport block used by the transmit end to provide the positive acknowledgement for the received data is used for description. The receive end may be a base station, and the transmit end may be a terminal. After receiving service data sent by the base station, the terminal may send a first transport block with an acknowledgement to the base station. The base station receives the first transport block with the acknowledgement, to learn that the terminal determines that the service data sent by the base station is received.

Operation 201 is a process of generating the prior information set by the receive end. Operation 201 usually needs to be performed only once. When a received transport block is subsequently decoded, operation 201 does not need to be performed, but only operation 202 needs to be directly performed.

When the transmit end sends a third transport block to the receive end, to improve transmission efficiency, the transmit end codes the third transport block to obtain a second transport block, and sends the second transport block to the receive end. The receive end receives the second transport block sent by the transmit end, and performs operation 202.

The operation in which the transmit end codes the third transport block to obtain the second transport block may be as follows:

The transmit end adds the third transport block to header information of a transport layer, and sends the header information of the transport layer to a data link layer of the transmit end. At the data link layer, the transmit end adds header information of a PDCP layer to the header information of the transport layer, generates protocol data unit (PDU) information, and sends the PDU information to an RLC layer in the data link layer. At the RLC layer, the transmit end segments and cascades the PDU information, adds header information of the RLC to the PDU information, and sends the PDU information to which the header information of the RLC layer is added to a MAC layer. At the MAC layer, the transmit end adds header information of the MAC layer to the PDU information to which the header information of the RLC layer is added, to obtain the second transport block.

As shown in FIG. 3, when the receive end decodes the second transport block for the first time, the receive end may directly decode the second transport block based on first demodulation information without using the prior information. When the decoding fails, the receive end performs operation 202, and decodes the second transport block based on both the first demodulation information and the prior information. The first demodulation information of the second transport block may include demodulation information of a system bit and demodulation information of a check bit. The system bit is used to carry service data or feedback information, and the check bit is used to carry check information.

The receive end decodes the second transport block based on the first demodulation information, to obtain a fourth transport block. The receive end determines whether the fourth transport block is the same as the third transport block. If the fourth transport is the same as the third transport block, the receive end determines that the decoding succeeds. If the fourth transport block is different from the third transport block, the receive end determines that the decoding fails.

The operation in which the receive end determines whether the fourth transport block is the same as the third transport block may be as follows:

The receive end obtains first verification information and second verification information. The first verification information is verification information of the third transport block, and the second verification information is verification information of the fourth transport block. The receive end determines whether the first verification information is the same as the second verification information. If the first verification information is the same as the second verification information, the receive end determines that the fourth transport block is the same as the third transport block. If the first verification information is different from the second verification information, the receive end determines that the fourth transport block is different from the third transport block.

The transmit end generates the first verification information based on a preset verification algorithm and the third transport block. When being to send the second transport block to the receive end, the transmit end may add the first verification information to the second transport block and then send the second transport block to the receive end. The transmit end may alternatively send only the first verification information to the receive end before or after sending the second transport block to the receive end. Correspondingly, the operation in which the receive end obtains the first verification information may be as follows:

The receive end obtains the first verification information from the second transport block, or the receive end receives the first verification information sent by the transmit end.

It should be noted that a transport block sent by the transmit end to the receive end is a coded transport block, to be specific, the transmit end codes the first verification information to obtain third verification information, and sends the third verification information to the receive end. Correspondingly, the operation in which the receive end obtains the first verification information from the second transport block may be as follows:

The receive end obtains the demodulation information of the check bit in the first demodulation information of the second transport block, and decodes the third verification information of the second transport block based on the demodulation information of the check bit, to obtain the first verification information.

When the receive end is to obtain the second verification information, the receive end generates the second verification information based on the preset verification algorithm and the fourth transport block.

The preset verification algorithm may be set and modified as required, and the preset verification algorithm is not specifically limited in this embodiment of this disclosure. For example, the preset verification algorithm may be a cyclic redundancy check (CRC) algorithm.

In a possible implementation, when the decoding succeeds, the receive end extracts prior information from the third transport block, and updates the prior information set based on the extracted prior information.

When the receive end updates the prior information set based on the extracted prior information, the receive end may directly add the extracted prior information to the prior information set. The receive end may alternatively replace, with the extracted prior information, prior information of a transport block, in the prior information set, whose decoding time is furthest from the current time.

A process in which the receive end extracts the prior information from the third transport block is similar to the process in which the receive end extracts the prior information from the first transport block. Details are not described herein.

Operation 202: When receiving the to-be-decoded second transport block sent by the transmit end, the receive end selects the first prior information from the prior information set, where the second transport block is a transport block obtained by the transmit end by coding the third transport block.

When the receive end selects the first prior information from the prior information set, the receive end may randomly select one piece of prior information from the prior information set, and use the selected prior information as the first prior information. The receive end may alternatively select, from the prior information set based on a decoding success time corresponding to each piece of prior information in the prior information set, prior information that is successfully decoded closest to the current time, and use the selected prior information as the first prior information.

It should be noted that in this operation, the receive end may select one or more pieces of prior information from the prior information set.

In a possible design of this embodiment of this disclosure, to improve security, the transmit end may further encrypt the third transport block, and code an encrypted third transport block to obtain the second transport block. In this case, the receive end needs to decode the second transport block by using encrypted prior information. Correspondingly, the operation in which the receive end selects the first prior information from the prior information set may be as follows:

The receive end selects third prior information from the prior information set, and the third prior information is prior information extracted by the receive end from an encrypted first transport block. The receive end determines a first encryption key based on a sixth transport block, and the sixth transport block is a successfully decoded transport block prior to the second transport block. The receive end encrypts the third prior information by using the first encryption key, to obtain the first prior information.

In this embodiment of this disclosure, the transmit end may encrypt the third transport block at the PDCP layer, and this operation may be as follows: At the PDCP layer, the transmit end obtains a quintet of parameters of the PDCP layer, generates the first encryption key based on the quintet of parameters and a preset encryption algorithm, and encrypts the third transport block by using the first encryption key, to obtain the encrypted third transport block.

The quintet of parameters may include: a key (KEY), a count (COUNT), a bearer (BEARER), a direction (DIRECTION), and a length (LENGTH). All transport blocks have a same key, bearer, direction, and length, but different counts. In other words, in a plurality of transport blocks, a parameter count is changing.

The parameter COUNT includes a hyper frame number (HFN) and a PDCP serial number (SN). The HFN and the PDCP SN are used to describe a serial number corresponding to the third transport block sent by the transmit end. In addition, a value of the HFN is related to only a value of the PDCP SN, to be specific, each time the transmit end sends a transport block to the receive end, the value of the PDCP SN increases by a first preset value, and when the value of the PDCP SN reaches a maximum value, the HFN increases by a second preset value, and the value of the PDCP SN is reset. The first preset value or the second preset value may be set and modified based on a user need. This is not specifically limited in this embodiment of this disclosure. For example, both the first preset value and the second preset value may be 1.

The operation in which the receive end determines the first encryption key based on the sixth transport block may be as follows: The receive end extracts a second encryption key from the sixth transport block, and determines the first encryption key based on the second encryption key and a preset key algorithm.

The second encryption key is a keystream used when the transmit end encrypts the sixth transport block. The receive end extracts the second encryption key from the sixth transport block: a first key, a first count, a first bearer, a first direction, and a first length, determines a second count based on the first count, and assembles the first key, the second count, the first bearer, the first direction, and the first LENGTH into the first encryption key.

The operation in which the receive end determines the second COUNT based on the first COUNT may be as follows:

The receive end increases a value of a PDCP SN in the first COUNT by the first preset value, to obtain the second COUNT.

It should be noted that the receive end encrypts the third prior information by using the first encryption key and the preset encryption algorithm, to obtain the first prior information. The preset encryption operation may be set and modified based on a user need, and is not specifically limited in this embodiment of this disclosure. For example, the preset encryption operation may be a bitwise exclusive OR operation. Correspondingly, the receive end performs a bitwise exclusive OR operation on the first encryption key and the third prior information, to obtain the first prior information.

The receive end sends the first prior information from the data link layer to the physical layer, so that the channel decoder of the physical layer decodes the second transport block in the following operation 203 by using the first prior information and the first demodulation information.

Operation 203: The receive end decodes the second transport block based on the first prior information and the first demodulation information of the second transport block, to obtain the third transport block.

This operation may be implemented in the following operations 2031 and 2032, including:

Operation 2031: The receive end performs saturation processing on the first demodulation information based on the first prior information, to obtain second demodulation information.

The first demodulation information includes the demodulation information corresponding to the system bit of the second transport block. The first demodulation information includes a plurality of pieces of first demodulation child information, and one piece of first demodulation child information corresponds to one piece of unit-bit system bit information of the second transport block. The first prior information includes a plurality of pieces of prior child information. One piece of first demodulation child information corresponds to one piece of prior child information. The receive end performs saturation processing on each piece of prior child information by using a preset saturation algorithm, to obtain second demodulation child information, and assembles the second demodulation child information corresponding to each piece of prior child information into the second demodulation information.

Each of the plurality of pieces of prior child information includes one piece of unit-bit identification information and one piece of unit-bit header information of a transmission protocol layer of the first transport block. The identification information in each piece of prior child information is used to identify whether the header information of the transmission protocol layer in the prior child information is used to decode the second transport block. The receive end presets first preset information and second preset information. The first preset information is used to identify that the receive end performs saturation processing on each piece of first demodulation child information in a first saturation processing manner. The second preset information is used to identify that the receive end performs saturation processing on each piece of first demodulation child information in a second saturation processing manner. In the first saturation processing manner, the receive end changes information of a preset bit in the first demodulation child information into a third preset value, and changes information of a bit other than the preset bit in the first demodulation child information into a fourth preset value. In the second saturation processing manner, the receive end changes information of a preset bit in the first demodulation child information into a fifth preset value, and changes information of a bit other than the preset bit in the first demodulation child information into a fourth preset value.

Correspondingly, the operation in which the receive end performs saturation processing on the prior child information by using the preset saturation algorithm, to obtain the second demodulation child information may be as follows:

If the identification information identifies that the header information of the transmission protocol layer in the prior child information is used to decode the second transport block, and the prior child information is the first preset information, for the first demodulation child information corresponding to the prior child information, the receive end changes the information of the preset bit in the first demodulation child information into the third preset value, and changes the information of the bit other than the preset bit in the first demodulation child information into the fourth preset value, to obtain the second demodulation child information.

Alternatively, if the identification information identifies that the header information of the transmission protocol layer in the prior child information is used to decode the second transport block, and the prior child information is the second preset information, for the first demodulation child information corresponding to the prior child information, the receive end changes the information of the preset bit in the first demodulation child information into the fifth preset value, and changes the information of the bit other than the preset bit in the first demodulation child information into the fourth preset value, to obtain the second demodulation child information.

Alternatively, if the identification information identifies that the header information of the transmission protocol layer in the prior child information is not used to decode the second transport block, for the first demodulation child information corresponding to the prior child information, the receive end uses the first demodulation child information as the second demodulation child information.

The first preset information is different from the second preset information. In addition, the first preset information and the second preset information may be set and modified as required, and are not specifically limited in this embodiment of this disclosure. For example, if the prior child information is identified by using binary data, the first preset information may be 11, and the second preset information may be 10.

The demodulation information may be a demodulation soft value, and the first demodulation information includes a demodulation soft value corresponding to each piece of unit-bit information in the system bit of the second transport block. The preset bit may be set and modified based on a user need, and is not specifically limited in this embodiment of this disclosure. For example, the demodulation soft value corresponding to each piece of unit-bit information in the system bit of the second transport block may be eight bits, and the preset bit may be the first bit or the eighth bit in the eight bits. For the demodulation soft value corresponding to each piece of unit-bit information, the preset bit is used to carry information for identifying that the demodulation soft value is a positive number or a negative number. When the information of the preset bit is 1, it indicates that the demodulation soft value is a positive number. When the information of the preset bit is 0, it indicates that the demodulation soft value is a negative number.

The identification information in the prior child information may be set and modified based on a user need, and is not specifically limited in this embodiment of this disclosure. For example, if the binary data is used to represent the prior child information, the identification information in the prior child information may be binary data 0 or 1. If the identification information in the prior child information is 1, the receive end determines that the header information of the transmission protocol layer in the prior child information is used to decode the second transport block. If the identification information in the prior child information is 0, the receive end determines that the header information of the transmission protocol layer in the prior child information is not used to decode the second transport block.

The third preset value is used to identify that the demodulation soft value is a positive number. The fourth preset value is used to identify a value of each bit in the demodulation soft value. The fifth preset value is used to identify that the demodulation soft value is a negative number. The third preset value is the same as the fourth preset value. The third preset value (or the fourth preset value) is different from the fifth preset value. In addition, the third preset value, the fourth preset value, and the fifth preset value may be set and modified based on a user need, and are not specifically limited in this embodiment of this disclosure. For example, the third preset value is 1, the fourth preset value is 1, and the fifth preset value is 0.

For example, an example in which the demodulation information is the demodulation soft value is used for description. If a bit width of the demodulation soft value corresponding to each piece of unit-bit information in the system bit of the second transport block is eight bits, and the preset bit is the first bit, the remaining seven bits are used to carry a specific value of the demodulation soft value. A bit width of one piece of prior child information may be two bits, the first bit is used to carry identification information, and the second bit is used to carry header information of a transmission protocol layer. When the identification information is 1, the header information of the transmission protocol layer in the prior child information is used to decode the second transport block. When the identification information is 0, the header information of the transmission protocol layer in the prior child information is not used to decode the second transport block. When the identification information is 1, the first preset information may be 11, the second preset information may be 10, the third preset value may be 1, the fourth preset value may be 1, and the fifth preset value may be 0. When the identification information is 0, the prior child information may be 01 or 00. Correspondingly, saturation processing is performed on a demodulation soft value corresponding to information of a $k^{th}$ bit in the system bit of the second transport block according to the following formula 1:

$$LLR(k) = \begin{cases} -127, \text{Bit}(k) = 2 \\ 127, \text{Bit}(k) = 3 \\ LLR_0, \text{Bit}(k) = 0 \text{ or } 1 \end{cases} \quad \text{Formula 1}$$

where k represents the $k^{th}$ bit in the second transport block, $LLR_0$ is the demodulation soft value corresponding to the information of the $k^{th}$ bit in the system bit of the second transport block, LLR(k) represents a demodulation soft value obtained after the saturation processing, and Bit(k) is prior child information corresponding to the information of the $k^{th}$ bit in the system bit of the second transport block. When Bit(k)=2, in other words, Bit(k) is 10, a value of the preset bit in the demodulation soft value is changed into 0, and a value of the bit other than the preset bit in the demodulation soft value is changed into 1, to obtain the demodulation soft value obtained after the saturation processing: 0111 1111, in other words, LLR(k)=−127. When Bit(k)=3, in other words, Bit(k) is 11, a value of the preset bit in the demodulation soft value is changed into 1, and a value of the bit other than the preset bit in the demodulation soft value is changed into 1, to obtain the demodulation soft value obtained after the saturation processing: 1111 1111, in other words, LLR(k)=127. When Bit(k)=0 or 1, in other words, Bit(k) is 00 or 01, the receive end directly uses $LLR_0$ as LLR(k).

In this embodiment of this disclosure, the receive end performs saturation processing on the first demodulation information by using the first prior information, to obtain the second demodulation information. The first prior information includes the header information of the transmission protocol layer, and there is a correlation between the header information of the transmission protocol layer of the second transport block and the header information of the transmission protocol layer of the first transport block. Therefore, the receive end decodes the second transport block by using the second demodulation information, so as to improve accuracy of decoding the second transport block.

In this embodiment of this disclosure, as shown in FIG. 3, the receive end may set a processing module at the physical layer, and the processing module is configured to perform saturation processing on the first demodulation information to obtain the second demodulation information. The process may be as follows: After the receive end sends the first prior information from the data link layer to the physical layer, the receive end receives the first prior information by using the processing module of the physical layer, and performs, by using the processing module, saturation processing on the first demodulation information by using the first prior information and the preset saturation algorithm, to obtain the second demodulation information.

Operation 2032: The receive end decodes the second transport block based on the second demodulation information, to obtain the third transport block.

In this operation, the receive end decodes the second transport block based on the second demodulation information, to generate a fifth transport block. The receive end determines whether the fifth transport block is the same as the third transport block. If the fifth transport block is the same as the third transport block, the receive end determines that the second transport block is successfully decoded. If the fifth transport block is different from the third transport block, the receive end determines that the second transport block fails to be decoded. If the second transport block is successfully decoded, this operation ends. If the second transport block fails to be decoded, the receive end selects second prior information from the prior information set. The second prior information is any prior information in the prior information set other than the first prior information. The receive end repeatedly decodes the second transport block based on the second prior information and the first demodulation information until the decoding succeeds, to obtain the third transport block.

In this embodiment of this disclosure, when the receive end successfully decodes the second transport block, the receive end sends the third transport block from the physical layer to the data link layer, and updates the prior information set at the data link layer based on the third transport block. The process may be as follows: The receive end extracts the prior information from the third transport block, and updates the prior information set based on the extracted prior information.

In a possible design of this embodiment of this disclosure, as shown in FIG. 3, when the receive end successfully decodes the second transport block, the receive end may store and update the prior information set by using the prior information estimation module of the data link layer. This operation may be as follows: The receive end extracts the prior information from the third transport block by using the prior information estimation module of the data link layer, adds the extracted prior information to the prior information set to obtain an updated prior information set, and stores the updated prior information set.

In this embodiment of this disclosure, the receive end extracts the prior information from the at least one first transport block that has been successfully decoded, and assembles the prior information into the prior information set. The prior information includes the header information of the transmission protocol layer of the at least one first transport block that has been successfully decoded. When receiving the to-be-decoded second transport block sent by the transmit end, the receive end selects the first prior information from the prior information set. The second transport block is the transport block obtained by the transmit end by coding the third transport block. Then, the receive end decodes the second transport block based on the first prior information and the first demodulation information of the second transport block, to obtain the third transport block. The receive end decodes the second transport block based on both the first demodulation information and the first prior information, and the first prior information includes the header information of the transmission protocol layer of the at least one first transport block that has been successfully decoded. Therefore, a bit error rate of decoding the second transport block by the receive end is reduced, and decoding accuracy is improved.

The following describes an apparatus embodiment of the embodiments of this disclosure, to execute the method embodiment of the embodiments of this disclosure. For details that are not disclosed in the apparatus embodiment of the embodiments of this disclosure, refer to the method embodiment of the embodiments of this disclosure.

Figure 4:
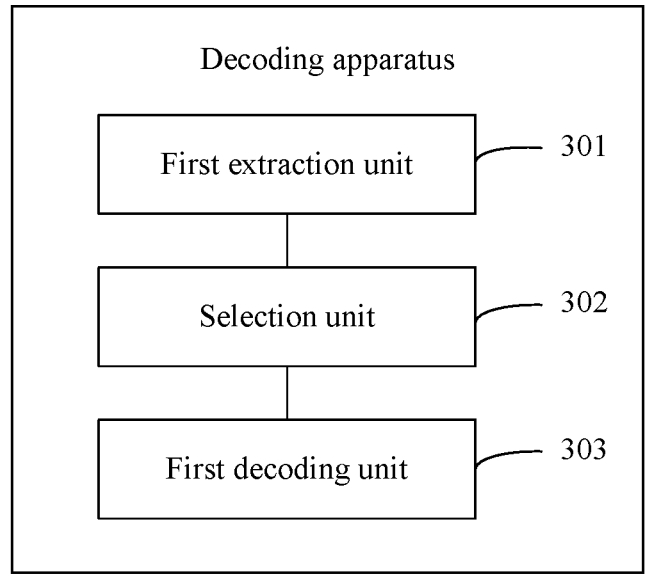
FIG. 4 is a block diagram of a decoding apparatus according to an embodiment of this disclosure.

FIG. 4 is a block diagram of a decoding apparatus according to an embodiment of this disclosure. The apparatus may be applied to a receive end. Referring to FIG. 4, the apparatus includes a first extraction unit 301, a selection unit 302, and a first decoding unit 303.

The first extraction unit 301 is configured to perform operation 201 and an optional solution thereof in the foregoing embodiment.

The selection unit 302 is configured to perform operation 202 and an optional solution thereof in the foregoing embodiment.

The first decoding unit 303 is configured to perform operation 203 and an optional solution thereof in the foregoing embodiment.

Figure 5:
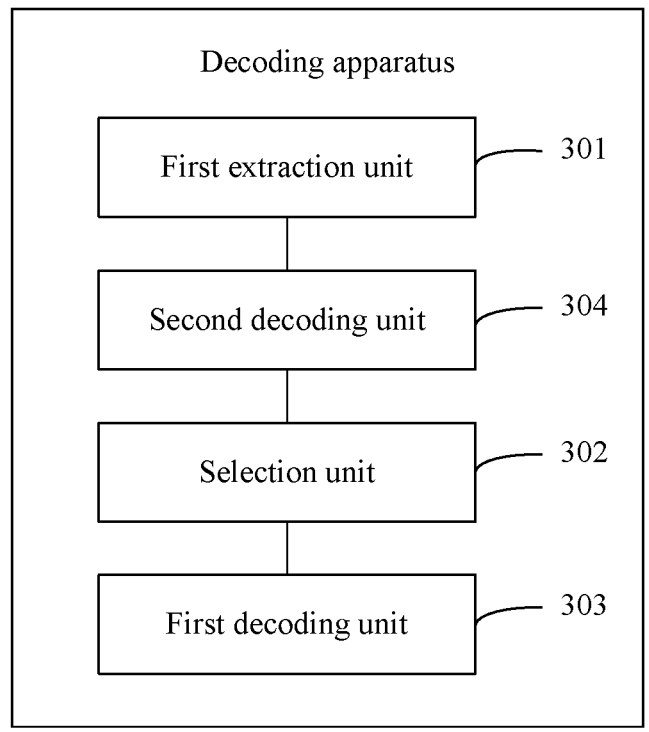
FIG. 5 is a block diagram of a decoding apparatus according to an embodiment of this disclosure.

Referring to FIG. 5, the apparatus includes a second decoding unit 304.

The second decoding unit 304 is configured to perform operation 202 and an optional solution thereof in the foregoing embodiment.

Figure 6:
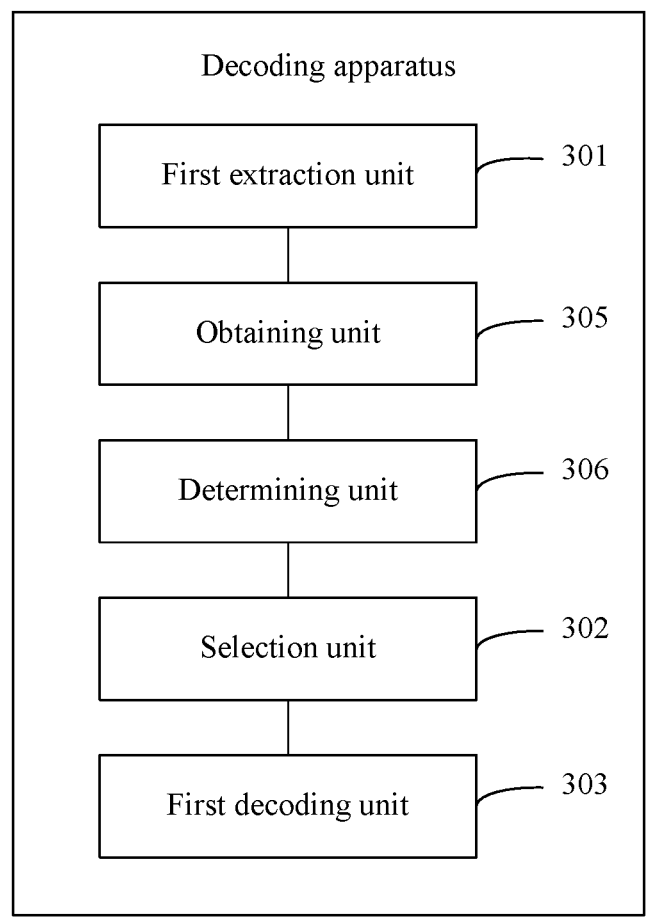
FIG. 6 is a block diagram of a decoding apparatus according to an embodiment of this disclosure.

Referring to FIG. 6, the apparatus includes an obtaining unit 305 and a determining unit 306.

The obtaining unit 305 is configured to perform operation 202 and an optional solution thereof in the foregoing embodiment.

The determining unit 306 is configured to perform operation 202 and an optional solution thereof in the foregoing embodiment.

Figure 7:
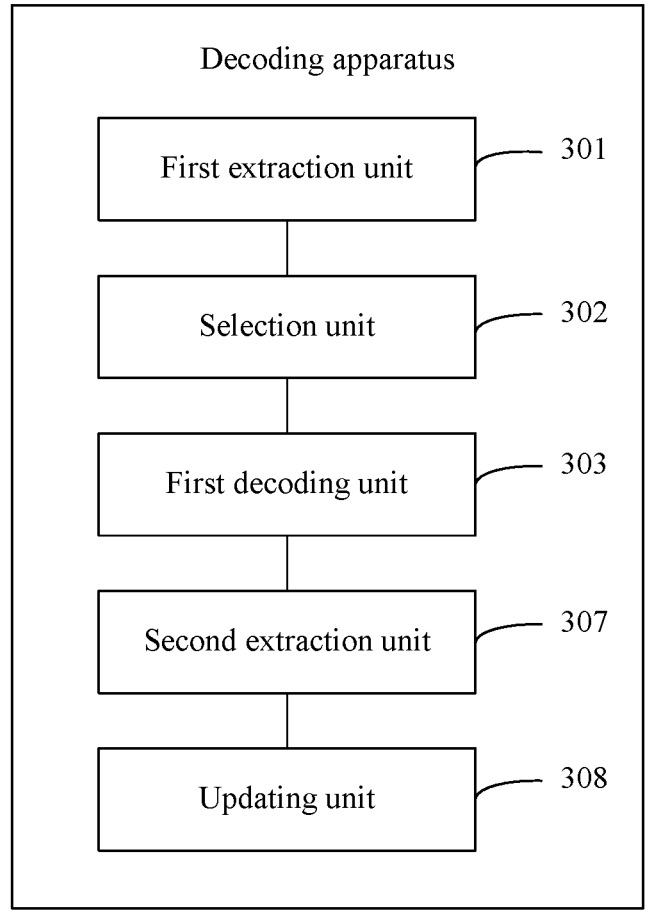
FIG. 7 is a block diagram of a decoding apparatus according to an embodiment of this disclosure.

Referring to FIG. 7, the apparatus includes a second extraction unit 307 and an updating unit 308.

The second extraction unit 307 is configured to perform operation 203 and an optional solution thereof in the foregoing embodiment.

The updating unit 308 is configured to perform operation 203 and an optional solution thereof in the foregoing embodiment.

In this embodiment of this disclosure, the receive end extracts the prior information from the at least one first transport block that has been successfully decoded, and assembles the prior information into the prior information set. The prior information includes the header information of the transmission protocol layer of the at least one first transport block that has been successfully decoded. When receiving the to-be-decoded second transport block sent by the transmit end, the receive end selects the first prior information from the prior information set. The second transport block is the transport block obtained by the transmit end by coding the third transport block. Then, the receive end decodes the second transport block based on the first prior information and the first demodulation information of the second transport block, to obtain the third transport block. The receive end decodes the second transport block based on both the first demodulation information and the first prior information, and the first prior information includes the header information of the transmission protocol layer of the at least one first transport block that has been successfully decoded. Therefore, a bit error rate of decoding the second transport block by the receive end is reduced, and decoding accuracy is improved.

It should be noted that, when the decoding apparatus provided in the foregoing embodiment performs decoding, division of the foregoing function modules is merely used as an example for description. In actual application, the foregoing functions may be allocated to different function modules for implementation as required, in other words, an internal structure of the apparatus is divided into different function modules, to implement all or some of the functions described above. In addition, the decoding apparatus provided in the foregoing embodiment has a same concept as the decoding method embodiment. For details about a specific implementation process of the decoding apparatus, refer to the method embodiment. Details are not described herein again.

Figure 8:
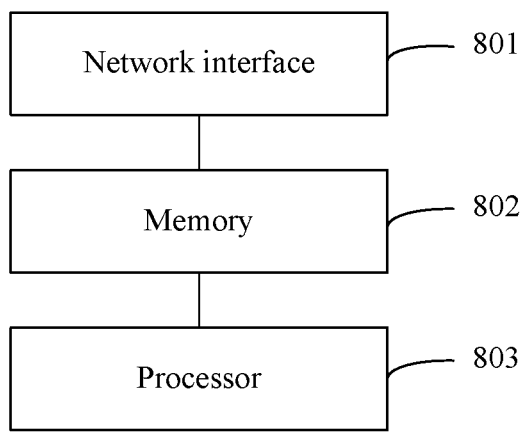
FIG. 8 is a block diagram of a decoding apparatus according to an embodiment of this disclosure.

An embodiment of this disclosure provides a receive end. Referring to FIG. 8, the device includes a network interface 801, a memory 802, and a processor 803.

The network interface 801 is configured to receive a transport block.

The memory 802 is configured to store an instruction and data.

The processor 803 is configured to read the instruction and the data that are stored in the memory 802, to perform the following operations:

extracting at least one piece of prior information from at least one first transport block that has been successfully decoded, and assembling the at least one piece of prior information into a prior information set, where one piece of prior information includes header information of a transmission protocol layer of one first transport block;

when a to-be-decoded second transport block sent by a transmit end is received, selecting first prior information from the prior information set, where the second transport block is a transport block obtained by the transmit end by coding a third transport block; and decoding the second transport block based on the first prior information and first demodulation information of the second transport block, to obtain the third transport block.

Figure 9:
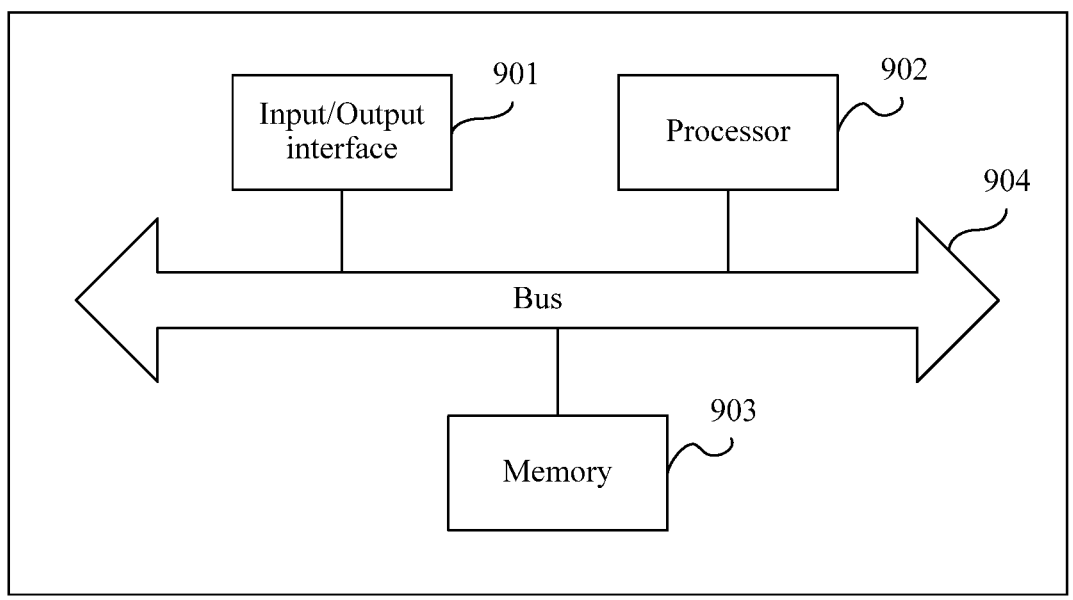
FIG. 9 is a block diagram of a decoding apparatus according to an embodiment of this disclosure.

An embodiment of this disclosure provides a system chip, applied to a receive end. Referring to FIG. 9, the chip includes an input/output interface 901, at least one processor 902, a memory 903, and a bus 904. The input/output interface 901 is connected to the at least one processor 902 and the memory 903 by using the bus 904, and the input/output interface 901 is configured to implement communication between the receive end and a transmit end. The at least one processor 902 executes an instruction stored in the memory 903, so that the receive end is enabled to perform the operations performed by the foregoing receive end.

A person of ordinary skill in the art may understand that all or some of the operations of the embodiments may be implemented by hardware or a program instructing related hardware. The program may be stored in a computer-readable storage medium. The storage medium may include: a read-only memory, a magnetic disk, or an optical disc.

The foregoing descriptions are merely alternative embodiments of this disclosure, but are not intended to limit this disclosure. Any modification, equivalent replacement, or improvement made without departing from the principle of this disclosure should fall within the protection scope of this disclosure.

What is claimed is:

1. A decoding method, wherein the method comprises:
    extracting at least one piece of prior information from at least one first transport block that has been successfully decoded, and assembling the at least one piece of prior information into a prior information set, wherein the at least one piece of prior information comprises header information of a transmission protocol layer of one first transport block;
    receiving a to-be-decoded second transport block sent by a transmit end, wherein the second transport block is a transport block obtained by coding a third transport block;
    decoding the second transport block based on a first demodulation information of the second transport block and without using any information from the prior information set to obtain a fourth transport block; and
    in response to determining that the fourth transport block is different from the third transport block, selecting a first prior information from the prior information set and decoding the second transport block based on the first prior information and a first demodulation information of the second transport block, to obtain the third transport block.

2. The decoding method according to claim 1, wherein the method further comprises:
    obtaining a first verification information and a second verification information, wherein the first verification information is a verification information of the third transport block, and the second verification information is a verification information of the fourth transport block; and
    In response to determining that the first verification information is different from the second verification information, determining that the fourth transport block is different from the third transport block.

3. The decoding method according to claim 1, wherein extracting the at least one piece of prior information from the at least one first transport block that has been successfully decoded, and assembling the at least one piece of prior information into the prior information set comprises:
    obtaining the at least one first transport block;
    extracting header information of a transmission protocol layer of each of the at least one transport block;
    generating the at least one piece of prior information based on the header information of the transmission protocol layer of each of the at least one transport block; and
    assembling the at least one piece of prior information into the prior information set.

4. The decoding method according to claim 1, wherein after decoding the second transport block based on the first prior information and first demodulation information of the second transport block, to obtain the third transport block, the method further comprises:
    extracting a prior information from the third transport block; and
    updating the prior information set based on the extracted prior information.

5. The decoding method according to claim 1, wherein decoding the second transport block based on the first prior information and first demodulation information of the second transport block, to obtain the third transport block comprises:
    performing saturation processing on the first demodulation information based on the first prior information, to obtain a second demodulation information; and
    decoding the second transport block based on the second demodulation information, to obtain the third transport block.

6. The decoding method according to claim 5, wherein decoding the second transport block based on the second demodulation information, to obtain the third transport block comprises:
    decoding the second transport block based on the second demodulation information, to obtain a fifth transport block;
    in response to determining that the fifth transport block is different from the third transport block, selecting second prior information from the prior information set, wherein the second prior information is any prior information in the prior information set other than the first prior information; and
    decoding the second transport block based on the second prior information and the first demodulation information, to obtain the third transport block.

7. The decoding method according to claim 1, wherein the second transport block is a transport block obtained by the transmit end by encrypting the third transport block; and the selecting of the first prior information from the prior information set comprises:
    selecting a third prior information from the prior information set, wherein the third prior information is a prior information extracted by a receive end from an encrypted first transport block;
    determining a first encryption key based on a sixth transport block, wherein the sixth transport block is a successfully decoded transport block prior to the second transport block; and
    encrypting the third prior information by using the first encryption key, to obtain the first prior information.

8. The decoding method according to claim 7, wherein determining a first encryption key based on a sixth transport block comprises:
    extracting a second encryption key from the sixth transport block; and
    determining the first encryption key based on the second encryption key and a preset key algorithm.

9. A decoding apparatus, wherein the decoding apparatus comprises:
    a processor; and
    a memory coupled to the processor and storing programming instructions for execution by the processor, the programming instructions instruct the processor to:
    extract at least one piece of prior information from at least one first transport block that has been successfully decoded, and assemble the at least one piece of prior information into a prior information set, wherein the at least one piece of prior information comprises header information of a transmission protocol layer of one first transport block;
    receive a to-be-decoded second transport block sent by a transmit end, wherein the second transport block is a transport block obtained by coding a third transport block;
    decode the second transport block based on a first demodulation information of the second transport block and without using any information from the prior information set to obtain a fourth transport block; and in response to determining that the fourth transport block is different from the third transport block, select a first prior information from the prior information set and decode the second transport block based on the first prior information and a first demodulation information of the second transport block, to obtain the third transport block.

10. The decoding apparatus according to claim 9, wherein the programming instructions further instruct the processor to:

obtain a first verification information and a second verification information, wherein the first verification information is a verification information of the third transport block, and the second verification information is a verification information of the fourth transport block; and in response to determining that the first verification information is different from the second verification information, determine that the fourth transport block is different from the third transport block.

11. The decoding apparatus according to claim 9, wherein the programming instructions instruct the processor to:

obtain the at least one first transport block;

extract a header information of a transmission protocol layer of each of the at least one transport block;

generate the at least one piece of prior information based on the header information of the transmission protocol layer of each of the at least one transport block; and assemble the at least one piece of prior information into the prior information set.

12. The decoding apparatus according to claim 9, wherein the programming instructions instruct the processor to:

extract a prior information from the third transport block; and update the prior information set based on the extracted prior information.

13. The decoding apparatus according to claim 9, wherein the programming instructions instruct the processor to:

perform saturation processing on the first demodulation information based on the first prior information, to obtain a second demodulation information; and decode the second transport block based on the second demodulation information, to obtain the third transport block.

14. The decoding apparatus according to claim 13, wherein the programming instructions instruct the processor to:

decode the second transport block based on the second demodulation information, to obtain a fifth transport block;

in response to determining that the fifth transport block is different from the third transport block, select second prior information from the prior information set, wherein the second prior information is any prior information in the prior information set other than the first prior information; and decode the second transport block based on the second prior information and the first demodulation information, to obtain the third transport block.

15. The decoding apparatus according to claim 9, wherein the second transport block is a transport block obtained by the transmit end by encrypting the third transport block; and the programming instructions instruct the processor to:

select a third prior information from the prior information set, wherein the third prior information is a prior information extracted by the receive end from an encrypted first transport block;

determine a first encryption key based on a sixth transport block, wherein the sixth transport block is a successfully decoded transport block prior to the second transport block; and encrypt the third prior information by using the first encryption key, to obtain the first prior information.

16. The decoding apparatus according to claim 15, wherein the programming instructions instruct the processor to:

extract a second encryption key from the sixth transport block; and determine the first encryption key based on the second encryption key and a preset key algorithm.

17. A non-transitory machine-readable medium having instructions stored therein, which, when executed by a processor, cause the processor to perform operations comprising:

extracting at least one piece of prior information from at least one first transport block that has been successfully decoded, and assembling the at least one piece of prior information into a prior information set, wherein the at least one piece of prior information comprises header information of a transmission protocol layer of one first transport block;

receiving a to-be-decoded second transport block sent by a transmit end, wherein the second transport block is a transport block obtained by coding a third transport block;

decoding the second transport block based on a first demodulation information of the second transport block and without using any information from the prior information set to obtain a fourth transport block; and in response to determining that the fourth transport block is different from the third transport block, selecting a first prior information from the prior information set and decoding the second transport block based on the first prior information and a first demodulation information of the second transport block, to obtain the third transport block.

18. The non-transitory machine-readable medium according to claim 17, the operations further comprising:

obtaining a first verification information and a second verification information, wherein the first verification information is a verification information of the third transport block, and the second verification information is a verification information of the fourth transport block; and in response to determining that the first verification information is different from the second verification information, determining that the fourth transport block is different from the third transport block.

19. The non-transitory machine-readable medium according to claim 17, the operations further comprising:

obtaining the at least one first transport block;

extracting a header information of a transmission protocol layer of each of the at least one transport block;

generating the at least one piece of prior information based on the header information of the transmission protocol layer of each of the at least one transport block; and assembling the at least one piece of prior information into the prior information set.

20. The non-transitory machine-readable medium according to claim 17, the operations further comprising:

extracting a prior information from the third transport block; and updating the prior information set based on the extracted prior information.

* * * * *